United States Patent [19]
de Montigny et al.

[11] 3,843,702
[45] Oct. 22, 1974

[54] PROCESS FOR THE MANUFACTURE OF TRIS-(TRIMETHYLSILOXY)-PHENYLSILANE

[75] Inventors: Armand de Montigny, Leverkusen; Werner Buchner, Opladen-Luetzenkirchen, both of Germany

[73] Assignee: Bayer Aktiengesellschaft, Leverkusen, Germany

[22] Filed: Oct. 29, 1973

[21] Appl. No.: 410,667

[30] Foreign Application Priority Data
Nov. 16, 1972  Germany............................ 2256166

[52] U.S. Cl. ........................... 260/448.2 E, 252/426
[51] Int. Cl. ................................................ C07f 7/08
[58] Field of Search .............................. 260/448.2 E

[56] References Cited
UNITED STATES PATENTS
3,308,092   3/1967   Lentz ...................... 260/448.2 E X
3,308,145   3/1967   Lentz ......................... 260/448.2 E Primary Examiner—Daniel E. Wyman
Assistant Examiner—Paul F. Shaver
Attorney, Agent, or Firm—Burgess, Dinklage & Sprung

[57] ABSTRACT

A method of producing tris-(trimethylsiloxy)-phenylsilane by hydrolytic reaction of trimethylchlorosilane, phenyltrichlorosilane and water, this reaction being carried out in the presence of 0.2 to 12 mols of hexamethyldisiloxane per mol of phenyltrichlorosilane, by adding an acid equilibration catalyst to the hexamethyldisiloxane before the beginning of the reaction and stirring this mixture either for 12 to 24 hours at room temperature or a shorter time at an elevated temperature which does not reach the boiling point, employing a molar ratio of trimethylchlorosilane to phenyltrichlorosilane of between 3.3:1 and 4:1 and gradually adding the water until an excess is present and the hydrolysis is complete, is disclosed in U.S. Pat. application Ser. No. 270,741. This method is improved, according to the present invention, by using as said acid equilibration catalyst an amount, equal to 0.02 to 20 per cent by weight of the hexamethyldisiloxane, of a perfluoroalkanesulphonic acid of the formula $C_nF_{2n+1}SO_3H$ wherein $n$ denotes an integer from 1 to 12.

3 Claims, No Drawings

PROCESS FOR THE MANUFACTURE OF TRIS-(TRIMETHYLSILOXY)-PHENYLSILANE

The present invention relates to the manufacture of tris-(trimethylsiloxy)-phenylsilane of the formula

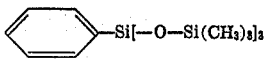

by hydrolytic reaction of trimethylchlorosilane, phenyltrichlorosilane and water.

Such a process of manufacture, which is characterized in that the reaction is carried out in the presence of 0.2 to 12 mols of hexamethyldisiloxane per mol of phenyltrichlorosilane, that a molar ratio of trimethylchlorosilane to phenyltrichlorosilane of between 3.3:1 and 4:1 is used and that water is added gradually until an excess is present and complete hydrolysis is reached, forms the subject of copending Pat. application Ser. No. 270,741, filed July 11, 1972, and assigned to the same assignee as the present invention. The advantage of this process over previously known processes, e.g. as disclosed in U.S. Pat. No. 3,012,052, is that the proportion of the initially mentioned tetrasiloxane in the mixture of the polymer-homologous hydrolysis products is increased.

A further subject of the application mentioned is an improvement in the process which is achieved in that 1 to 20 per cent by weight of an acid equilibration catalyst, preferably concentrated sulphuric acid, is added to the additionally used hexamethyldisiloxane before the beginning of the reaction and the mixture is stirred for 12 to 24 hours at room temperature or for a shorter time at an elevated temperature below the boiling point.

A preferred embodiment of this process is characterized in that first the mixture of hexamethyldisiloxane and sulphuric acid is warmed to 50° C for about 30 minutes, the phenyltrichlorosilane is gradually added thereto, thereafter the trimethylchlorosilane is added at 30° C and finally the water is stirred in at room temperature, the addition being spread over a prolonged period. In this case, the amount of acid can be kept low and the acid can thus also be removed more easily from the reaction product.

As a further development of the process it has now been found that while maintaining an equally good yield the amount of the acid which is used as the equilibration catalyst can be reduced substantially further, even to below 1 per cent by weight, if instead of sulphuric acid a perfluoroalkanesulphonic acid is used.

Accordingly, the additionally improved process for the manufacture of tris-(trimethylsiloxy)-phenylsilane by hydrolytic reaction of trimethylchlorosilane, phenyltrichlorosilane and water, this reaction being carried out in the presence of 0.2 to 12 mols of hexamethyldisiloxane per mol of phenyltrichlorosilane, by adding an acid equilibration catalyst to the hexamethyldisiloxane before the beginning of the reaction and stirring this mixture either for 12 to 24 hours at room temperature or a shorter time at an elevated temperature which does not reach the boiling point, employing a molar ratio of trimethylchlorosilane to phenyltrichlorosilane of between 3.3:1 and 4:1 and gradually adding the water until an excess is present and the hydrolysis is complete, is characterized in that the acid equilibration catalyst used is an amount, equal to 0.02 to 20 per cent by weight of the hexamethyldisiloxane, of a perfluoroalkanesulphonic acid of the formula $C_nF_{2n+1}SO_3H$ wherein $n$ denotes an integer from 1 to 12, preferably perfluoromethanesulphonic acid, perfluorobutanesulphonic acid or perfluorooctanesulphonic acid.

Here again, the embodiment to be preferred is that in which first the mixture of hexamethyldisiloxane and perfluoroalkanesulphonic acid is warmed to 50° C for about 30 minutes, the phenyltrichlorosilane is added gradually thereto, thereafter the trimethylchlorosilane is added at 30° C and finally the water is stirred in at room temperature over a prolonged period of time.

EXAMPLE 1

A mixture of 974 g (6 mols) of hexamethyldisiloxane and 0.2 g (0.02 percent of the weight of the siloxane) of perfluoromethanesulphonic acid is heated, with continuous stirring, initially for 30 minutes to 50° C, and 212 g (1 mol) of phenyltrichlorosilane are added dropwise over the course of a further 15 minutes; the mixture is then allowed to cool. When the temperature has reached 30° C, 435 g (4 mols) of trimethylchlorosilane are added over the course of 15 minutes, followed by 180 g (10 mols) of water added dropwise over the course of 6 hours; thereafter, stirring is continued for a further hour. After the aqueous phase has settled out and been separated off, the oil thus obtained is washed with aqueous sodium chloride solution until it gives a neutral reaction and is distilled. Hexamethyldisiloxane is first obtained followed, at 0.07 mm Hg and 65° C, by 314 g (= 84 percent of the theoretical amount) of pure tris-(trimethylsiloxy)-phenylsilane.

EXAMPLE 2

If a procedure analogous to Example 1 is followed with the modification that the amount of the perfluoromethanesulphonic acid is increased to 1 g (0.1 percent of the siloxane mixture), the yield increases to 89.5 percent of the theoretical amount.

EXAMPLE 3

If a procedure analogous to Example 1 is followed with the modification that instead of perfluoromethanesulphonic acid 4 g of perfluorobutanesulphonic acid (0.4 percent of the weight of the siloxane) are used, 342 g of tris-(trimethylsiloxy)-phenylsilane (92 percent of the theoretical amount) are obtained.

EXAMPLE 4

If a procedure analogous to Example 1 is followed with the modification that instead of perfluoromethanesulphonic acid 5 g of perfluorooctanesulphonic acid (0.5 percent of the weight of the siloxane) are used, a yield of 90 percent of the theoretical amount results.

What we claim is:

1. In a process for the production of tris-(trimethylsiloxy)-phenylsilane comprising the hydrolysis of a mixture of trimethylmonochlorosilane and monophenyltrichlorosilane with water, said hydrolysis being carried out in the presence of 0.2 to 12 mols of hexamethyldisiloxane per mol of phenyltrichlorosilane, by adding an acid equilibration catalyst to the hexamethyldisiloxane before the beginning of the reaction and stirring this mixture either for 12 to 24 hours at room temperature or a shorter time at an elevated temperature which does not reach the boiling point, employing a molar ratio of trimethylchlorosilane to phenyltrichlorosilane of between 3.3:1 and 4:1 and gradually adding the water until an excess is present and the hydrolysis is complete, the improvement which comprises using as said acid equilibration catalyst an amount, equal to 0.02 to 20 per cent by weight of the hexamethyldisiloxane, of a perfluoroalkanesulphonic acid of the formula $C_nF_{2n+1}SO_3H$ wherein $n$ denotes an integer from 1 to 12.

2. A process according to claim 1, wherein said perfluoroalkanesulphonic acid is selected from the group consisting of perfluoromethanesulphonic acid, perfluorobutanesulphonic acid and perfluorooctanesulphonic acid.

3. A process according to claim 1, wherein the mixture of hexamethyldisiloxane and perfluoroalkanesulphonic acid is warmed to 50° C for about 30 minutes, the phenyltrichlorosilane is gradually added thereto, the trimethylchlorosilane is added at 30° C and finally the water is stirred in at room temperature over the course of a prolonged period.

* * * * *